United States Patent [19]

Basset et al.

[11] Patent Number: 4,832,859
[45] Date of Patent: May 23, 1989

[54] LUBRICANTS AND NEW POLYFLUORINATED COMPOUNDS WHICH CAN BE USED AS ADDITIVES

[75] Inventors: Dominique Basset, Poissy; Jean-Claude Fayard, Lyons; Marc Hermant, Cormeilles-en-Parisis; Pierre Durual, Vernaison; Laurent Germanaud, Irigny, all of France

[73] Assignee: Atochem, Puteaux, France

[21] Appl. No.: 52,260

[22] Filed: May 20, 1987

[30] Foreign Application Priority Data

May 30, 1986 [FR] France ................................ 86 07789

[51] Int. Cl.$^4$ ..................... C10M 131/00; C07C 91/06
[52] U.S. Cl. ........................................ 252/51; 564/355; 564/366; 564/462
[58] Field of Search ................... 252/51; 564/366, 355, 564/462

[56] References Cited

U.S. PATENT DOCUMENTS

| | | | |
|---|---|---|---|
| 2,409,287 | 1/1943 | Kharasch et al. | 564/366 |
| 2,432,905 | 7/1946 | Kharasch et al. | 564/366 |
| 2,764,603 | 9/1956 | Ahlbrecht et al. | 252/51 |
| 3,227,761 | 1/1966 | DeBrunner et al. | 252/51 |
| 3,535,381 | 10/1970 | Hauptschein et al. | 252/525 |
| 3,565,926 | 2/1971 | Furey | 252/33.6 |
| 3,763,225 | 10/1973 | Foulletier et al. | 564/462 |
| 3,845,051 | 10/1974 | Zollinger | 252/51 |
| 3,873,619 | 3/1975 | Foulletier et al. | 564/462 |
| 4,059,613 | 11/1977 | Nakamura et al. | 252/51.5 R |
| 4,584,116 | 4/1986 | Hermant et al. | 252/51 |
| 4,584,404 | 4/1986 | Molloy et al. | 564/366 |

OTHER PUBLICATIONS

Graham et al., "The Pharmacology of a Series of Substituted 2-Halogenoalkylamines", 1961.
French Search Report No. FR 86 07 789.

*Primary Examiner*—William R. Dixon, Jr.
*Assistant Examiner*—Ellen McAvoy
*Attorney, Agent, or Firm*—Stevens, Davis, Miller & Mosher

[57] ABSTRACT

In order to improve the wear resistance properties of lubricants, at least one compound of the following formula is incorporated therein:

$$Rf-(CH_2CF_2)_a(CF=CH)_b(CH_2)_c-N \begin{matrix} (X)_{\overline{m}}-(CH_2CH-OR_2)_{1-m} \\ | \\ R_1 \\ \\ (Y)_{\overline{n}}-(CH_2CH-OR'_2)_{1-n} \\ | \\ R'_1 \end{matrix} \quad (I)$$

Rf is a perfluorinated radical,
a=0 to 10,
b=0 or 1 (if a=o and c=1),
c=1 to 4 (2 if a≠0),
m=0 or 1,
n=0 or 1,
X is an aryl radical,
Y is a 2-hydroxy-1-phenylethyl group,
$R_1$ and $R'_1$ each represent a hydrogen atom or an alkyl, cycloalkyl or aryl radical,
$R_2$ and $R'_2$ each represent a hydrogen atom or an acyl residue, at least one of the symbols $R_1$ and $R_2$ being other than H or $CH_3$ if the sum a+m+n=0.

12 Claims, No Drawings

LUBRICANTS AND NEW POLYFLUORINATED COMPOUNDS WHICH CAN BE USED AS ADDITIVES

The present invention relates to the field of lubricants and, more particularly, to the incorporation of fluorinated organic compounds into lubricants with a view to improving their wear resistance properties.

The application of some organofluorine derivatives as additives to lubricant compositions is known; for example, the application of salts of aliphatic amines and perhalogenated monocarboxylic acids has been described in U.S. Pat. No. 3,565,926, and the application of derivatives obtained by reacting an aromatic amine and a fluorinated organic compound chosen from fluorinated saturated monocarboxylic acids or fluorinated monocarboxylic acid chlorides has also been disclosed in French Pat. No. 2,026,493. However, these carboxylic derivatives have the drawback of losing their wear resistance efficacy in the presence of conventional additives such as detergent-dispersant additives, either due to physicochemical interactions which prevent their adsorption to the surfaces to be lubricated, or because of chemical interactions, especially when the detergent-dispersant additives are neutral or excess base-containing alkaline-earth metal salts.

More recently, the use of polyfluorinated chain amines or amino alcohols has been proposed in French Pat. No. 2,520,377. Although these amines and amino alcohols, in combination with detergent-dispersant additives, make is possible to obtain lubricant compositions with remarkable wear resistance properties and friction-reducing power, their use is often limited because of their high volatility which gives rise to a decrease in their efficiency over a period of time.

It has now been found that this drawback may be overcome by using, as fluorinated wear resistance additives, compounds of general formula:

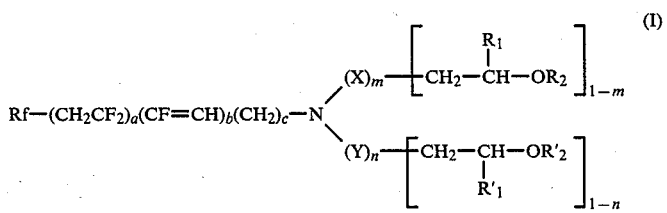

in which:
Rf denotes a perfluorinated radical, preferably a straight-chain or branched perfluoroalkyl radical containing from 2 to 20 carbon atoms and, more particularly, a straight-chain perfluoroalkyl radical containing from 6 to 16 carbon atoms;
a is an integer ranging from 0 to 10, preferably from 0 to 3;
b is equal to 0 or 1, but can be equal to 1 only if, simultaneously, a is equal to 0 and c is equal to 1;
c is integer which may range from 1 to 4, but is equal to 2 when a is other than 0;

m and n are each equal to 0 or 1;
X represents an optionally substituted aryl radical, preferably a phenyl radical, unsubstituted or substituted with an alkyl or alkoxy group containing from 1 to 4 carbon atoms;
Y represents the 2-hydroxy-1-phenylethyl group;
$R_1$ and $R'_1$, which may be identical or different, each represent a hydrogen atom, an alkyl radical containing 1 to 20 carbon atoms, a cycloalkyl radical containing 5 or 6 carbon atoms, or an optionally substituted aryl radical; and
$R_2$ and $R'_2$, which may be identical or different, each represent a hydrogen atom or an acyl residue of an aliphatic, alicyclic or aromatic carboxylic acid,
at least one of the symbols $R_1$ and $R_2$ being other than hydrogen or a methyl radical if the sum a+m+n is zero.

According to the present invention, a single compound of formula (I) or a mixture of these compounds may be used. From an economic point of view, it is most particularly advantageous to use a mixture of compounds which have different Rf radicals.

Some compounds of formula (I) are known, i.e. those of formula:

described in French Addition No. 93,239 and French Pat. No. 2,205,894. The other compounds are new products and, as such, form part of the present invention.

In general, compounds of formula (I) may be prepared according to methods which per se (see, for example, French Pat. No. 1,532,284 and its Additions Nos. 93,170, 93,239, 95,059, and 2,102,753, as well as French Pat. No. 2,205,894) from the iodine derivatives of formula:

by condensation with an arylamine X—NH$_2$ or an amino alcohol of formula

followed by the reaction of an epoxide with the fluorinated amine formed of formula:

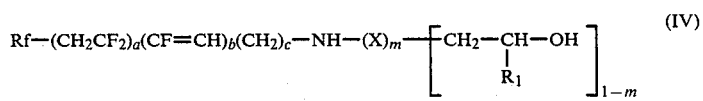

and if required, the esterification of the fluorinated diol or amino alcohol thereby obtained.

It should be pointed out, when an iodide of the Rf—CH$_2$CH$_2$I type and an amino alcohol (III) are employed simultaneously, that the condensation generally leads to a mixture of fluorinated amines of formulae:

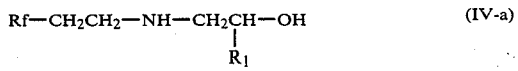
$$\text{Rf—CH}_2\text{CH}_2\text{—NH—CH}_2\text{CH—OH} \quad \text{(IV-a)}$$
$$|$$
$$R_1$$

and

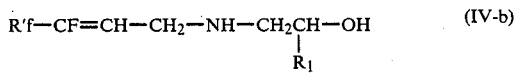
$$\text{R'f—CF=CH—CH}_2\text{—NH—CH}_2\text{CH—OH} \quad \text{(IV-b)}$$
$$|$$
$$R_1$$

in which R'f is a perfluorinated radical containing one carbon atom less than the radical Rf. However, it is possible, if desired, to separate the two amines by gas chromatography. The saturated amine (IV-a) may also be prepared selectively using a large excess of amino alcohol (III). Similarly, the unsaturated amine (IV-b) may be prepared selectively by condensing the amino alcohol (III) with a fluorinated olefin Rf—CH=CH$_2$ according to U.S. Pat. No. 3,535,381.

The condensation reaction of the iodide (II) with the arylamine X—NH$_2$ or the amino alcohol (III) may be carried out in the absence of a solvent at a temperature which may range up to 160° C., but it may also be carried out under reflux in an inert solvent which is advantageously chosen from C$_4$ to C$_6$ aliphatic alcohols.

As non-limiting examples of epoxides, ethylene oxide, propylene oxide, 1,2-epoxybutane, 1,2-epoxyhexane, 1,2-epoxydodecane, 1,2-epoxyoctadecane and styrene oxide may more especially be mentioned. The reaction of the epoxide with the intermediate fluorinated amines (IV) may be carried out in different ways depending on the nature of the epoxide used. If an epoxide with is usually gaseous is used, the reaction is preferably carried out by bubbling through or in an autoclave, whereas with a liquid epoxide, the reaction may be carried out by simply heating the mixture of the amine and the epoxide.

The optional esterification of the fluorinated diol or amino alcohol in order to obtain the compounds of formula (I) in which R$_2$ and/or R'$_2$ represent an acyl residue, may be carried out between 0° and 100° C. using a carboxylic acid or a derivative of formula:

$$R_3\text{—CO—Z} \quad \text{(V)}$$

in which Z represents an OH group, a chlorine atom or a alkoxy group containing from 1 to 5 carbon atoms, and R$_3$ represents a straight-chain or branched, saturated or unsaturated aliphatic radical containing from 1 to 30 carbon atoms and preferably 4 to 22 carbon atoms, an alicyclic radical or an aromatic radical.

When an acid (Z=OH) is employed, the reaction is carried out in the presence of a water-trapping agent such as sulphuric acid or a molecular sieve. The water formed may be removed by azeotropic distillation using an inert solvent, preferably an aromatic solvent such as, for example, benzene, toluene or xylene.

If a carboxylic acid ester (Z=alkoxy) is used, the reaction is carried out in the presence of a transesterification catalyst, for example, sulphuric acid, p-toluenesulphonic acid or aluminium alcoholate. The ester R$_3$COZ in excess may be used as the reaction solvent.

When the esterification is carried out using an acid chloride (Z=Cl), the reaction is carried out in the presence of a hydracid trapping agent, such as tertiary amines containing 3 to 20 carbon atoms and preferably chosen from trimethylamine, triethylamine, tripropylamine, tributylamine, tripentylamine and pyridine. This type of esterification is generally carried out in a solvent consisting of an aliphatic ether (ethyl, propyl, isopropyl, butyl, isobutyl or amyl ether, methyl tert-butyl ether, methyl tert-amyl ether) or a halogenated aliphatic hydrocarbon such as, for example, methylene chloride and chloroform.

As examples of acid chlorides which can be used, butyryl, caproyl, capryloyl, isovaleryl, lauroyl, linoleyl, heptanoyl, oleyl, palmitoyl, pelargonyl, phenylacetyl, pivaloyl, stearoyl, undecenoyl, benzoyl, 2-methylbenzoyl, 4-tert-butylbenzoyl or cinnamoyl chlorides may more particularly be mentioned.

The majority of the iodine derivatives of formula (II) are known products, the preparation of which has been described, for example, by R. N. Haszeldine (J.C.S. 1949, 2856–2861 and J.C.S. 1953, 3761) and G.V.C. Tiers (J.A.C.S. 1953, 75, 5978), and in French Pat. No. 2,211,430 and in Phosphorus and Sulfur 1984, 20, 197.

Among the compounds of formula (I) according to the invention, those of formula (I-a) and those of the following formulae are most particularly preferred:

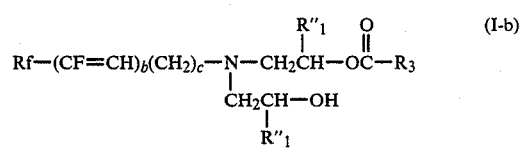
$$\text{Rf—(CF=CH)}_b(\text{CH}_2)_c\text{—N—CH}_2\text{CH—OC—R}_3 \quad \text{(I-b)}$$

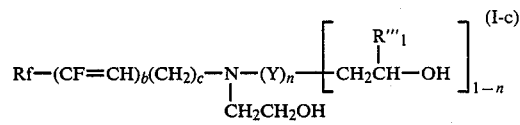
$$\text{Rf—(CF=CH)}_b(\text{CH}_2)_c\text{—N—(Y)}_n\text{—[CH}_2\text{CH—OH]}_{1-n} \quad \text{(I-c)}$$

in which the sum b+c is equal to 2, R''$_1$ is a hydrogen atom or a methyl radical and R'''$_1$ represents an alkyl radical containing an even number from 2 to 16 of carbon atoms.

The quantity of additive(s) of formula (I) to be added to a lubricating oil in order to obtain an optimal efficacy is at least 0.01% relative to the weight of the oil and is preferably between 0.05 and 0.5%. The additives according to the invention preferably consist of industrial products in which the proportion of compounds of formula (I) in which b=0 is at least equal to 10% by weight.

The lubricating oil may be a mineral oil, a synthetic hydrocarbon, a synthetic oil belonging to the following different families: glycols, glycol esters, glycol esters, polyoxyalkylene glycols, their ethers and their esters, esters of monocarboxylic or polycarboxylic acids and monoalcohols or polyalcohols, this list not being limiting.

When petroleum fractions intended for the manufacture of engine oils, such as the "neutral solvent" bases, are used as lubricant bases, conventional detergent-dispersant additives such as calcium or barium alkylarylsulphonates and alkylphenates, or "ashless" dispersants such as succinic acid derivatives are advantageously combined with the organofluorine derivatives of the invention. The detergent-dispersant additives promote the solubilization of the fluorinated additives in the oil without affecting the wear resistance properties of the latter and without losing their own strength.

The addition of the fluorine derivatives according to the invention to the oils formulated already containing additives such as zinc alkyldithiophosphates causes a substantial improvement in the wear resistance power and an increase in the charge capacity of these oils without affecting the properties contributed by the other additives: for example, dispersibility, detergency and anti-corrosion power.

In oil formulations for internal combustion engines, the substitution of all or a part of the zinc dithiophosphate used as wear resistance additive with 0.1 to 0.2% of the organofluorine compounds according to the invention enables a level of protection against wear equal to or greater than that obtained with this conventional additive to be achieved.

The fluorinated additives according to the invention may therefore be used either as substitutes for zinc alkyldithiophosphates in lubricating oils for petrol engines or diesel engines, or as a supplementary additive in these oils.

The following examples and tests illustrate the invention without limiting it. Unless otherwise stated, the precentages are expressed by weight.

EXAMPLE 1

At ambient temperature and with constant stirring, 5.84 g of heptanoyl chloride are added dropwise to a solution of 21.4 g of a mixture of the fluorinated aminodiols $C_8F_{17}CH_2-CH_2N(CH_2CH_2OH)_2$ and $C_7F_{15}CF=CH-CH_2N(CH_2CH_2OH)_2$ (65 and 35 mol % respectively) and 4 g of triethylamine in 100 g of diisopropyl ether.

When the addition of heptanoyl chloride is complete, the solution is heated for 2 hours at 60° C. After cooling, the triethylamine hydrochloride is filtered and washed with ether, and the solvent is removed by evaporation under vacuum. The residue characterized by infrared spectroscopy (alcohol band at 3400 cm$^{-1}$ and ester band at 1,730 cm$^{-1}$), correspond mainly to esters of formulae:

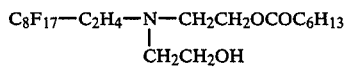

and

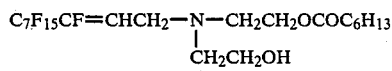

Yield: 94%.

EXAMPLE 2

The reaction is carried out as in Example 1, but replacing the mixture of fluorinated aminodiols with the same molar proportion of an industrial mixture of fluorinated aminodiols of formulae:

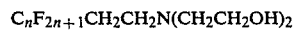

and

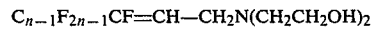

in which n is equal to 6, 8, 10, 12 and 14, percentages by weight of 56.2%, 27.2%, 12.3%, 3.7% and 0.6% respectively. This mixture, the mean molar mass of which is 510, contains approximately 65 mol % of saturated aminodiols and 35 mol % of unsaturated aminodiols.

A mixture mainly consisting of the esters of the following formulae is obtained, with a yield of 96%:

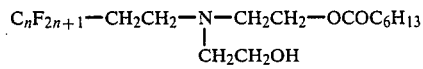

and

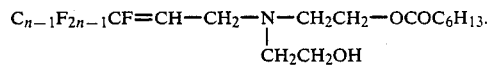

EXAMPLE 3

The reaction is carried out as in Example 1, but replacing the heptanoyl chloride with 8.6 g of lauroyl chloride and the diisopropyl ether with 150 g of methyl tert-butyl ether.

A mixture mainly consisting of the esters of the following formulae, and characterized by infrared spectroscopy (alcohol band: 3,400 cm$^{-1}$, ester band: 1,735 cm$^{-1}$) are obtained, with a yield of 95%:

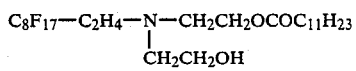

and

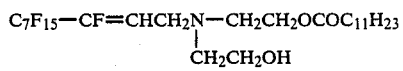

EXAMPLE 4

Example 3 is repeated, but replacing the $C_8F_{17}$ and $C_7F_{15}$ aminodiols with an equivalent molar proportion of the industrial mixture of fluorinated aminodiols defined in Example 2.

A mixture mainly consisting of the esters of the following formulae are obtained, with a yield of 98%:

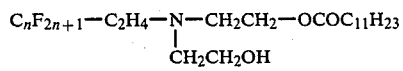

and

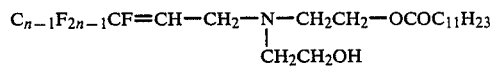

EXAMPLE 5

The reaction is carried out as in Example 1, but replacing the heptanoyl chloride and the $C_8F_{17}$ and $C_7F_{15}$ aminodiols with equivalent molar quantities of oleyl chloride and the same mixture of fluorinated aminodiols as in Example 2 respectively. Heating is carried out only for 1 hour at 60° C.

A mixture mainly consisting of the esters of the following formulae, characterized by infrared spectroscopy (alcohol band: 3,420 cm$^{-1}$; ester band: 1,740 cm$^{-1}$) is obtained in the form of a dark liquid, with a yield of 94%:

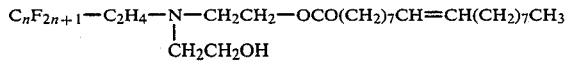

and

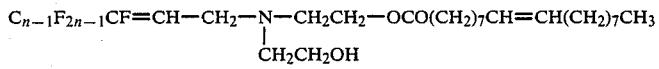

EXAMPLE 6

The reaction is carried out as in Example 1, but replacing the heptanoyl chloride with 5.52 g of benzoyl chloride and heating for 4 hours at 60°–70° C.

A mixture mainly consisting of the esters of the following formulae, in the form of a viscous orange liquid, characterized by infrared spectroscopy (alcohol band: 3,440 cm$^{-1}$; ester band: 1,720 cm$^{-1}$), is obtained, with a yield of 95%:

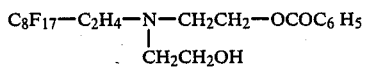

and

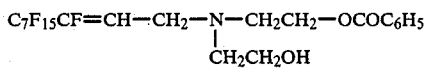

EXAMPLE 7

Example 6 is repeated, replacing the $C_8F_{17}$ and $C_7F_{15}$ aminodiols with the industrial mixture of fluorinated aminodiols defined in Example 2. The product obtained is a viscous liquid, slightly cloudy at ambient temperature. Yield: 87%.

EXAMPLE 8

12.2 g of heptanoyl chloride are added dropwise to a solution of 22.5 g of the mixture of $C_8F_{17}$ and $C_7F_{15}$ fluorinated aminodiols defined in Example 1 and 8.3 g of triethylamine in 120 g of diisopropyl ether, at ambient temperature and with constant stirring. The solution is then heated under reflux for 4 hours. After cooling, the triethylamine hydrochloride is filtered and washed with ether, the solvent is then removed by evaporation under vacuum.

A mixture of diesters of the following formulae, characterized by infrared spectroscopy (absence of OH band at 3,400 cm$^{-1}$; ester band present at 1,730 cm$^{-1}$), is thereby obtained, in the form of a very fluid orange yellow liquid, with a yield of 88%:

$$C_8F_{17}-C_2H_4-N(CH_2CH_2-OCOC_6H_{13})_2$$

and $$C_7F_{15}CF=CH-CH_2N(CH_2CH_2-OCOC_6H_{13})_2.$$

EXAMPLE 9

The reaction is carried out as in Example 8, but replacing the $C_8F_{17}$ and $C_7F_{15}$ aminodiols with 20.9 g of the industrial mixture of fluorinated aminodiols defined in Example 2. The yield of the diesters of the following formulae is 96%:

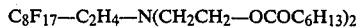

and $$C_{n-1}F_{2n-1}CF=CH-CH_2-N(CH_2CH_2-OCOC_6H_{13})_2.$$

EXAMPLE 10

(a) 0.2 l of ethanol, 23.65 g of 3-perfluorooctyl-propanenitrile and 1 g of Raney nickel suspended in 20 ml of ethanol are introduced into a 1-liter Hastelloy C autoclave equipped with a magnetic stirrer. After closing the autoclave, 19 g of ammonia, and then 6 MPa of hydrogen are introduced and the contents are heated to 90° C. Stirring is then initiated and the mixture is maintained at 90° C. until the pressure ceases to drop (approximately 1.5 hour).

The autoclave is then cooled, depressurized and purged with nitrogen. After filtering the catalyst and evaporating the ethanol, 21 g of 3-perfluorooctyl-propylamine are obtained in the form of a white powder melting at 70° C.

(b) 71.6 g of this amine and 14.2 g of ethylene oxide are introduced into a 0.5-liter Hastelloy C autoclave equipped with a PTFE bowl and a magnetic stirrer, and the contents are then heated to 75° C., with stirring. The temperature then rises up to 105° C. by itself. The mixture is cooled to 85° C. and maintained at this temperature for one hour. After removal from the autoclave the product is maintained at 120° C. under 133 Pa for one hour and 77 g of N-(3-perfluorooctylpropyl)diethanolamine, in the form of a grey solid, melting at 58°–59° C., are thereby obtained.

(c) The reaction is carried out as in Example 1, but replacing the $C_8F_{17}$ and $C_7F_{15}$ aminodiols with 22.2 g of N-(3-perfluorooctylpropyl)diethanolamine. 24.7 g of an orange yellow liquid which solidifies at approximately 20° C. are thereby obtained. In infrared spectroscopy, an OH band at 3,400 cm$^{-1}$ and an ester band at 1,720 cm$^{-1}$, corresponding to the ester of the following formula are observed:

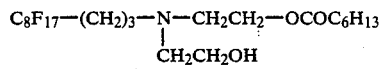

EXAMPLE 11

4.3 g of acetyl chloride are added dropwise to a solution of 30 g of the mixture of $C_8F_{17}$ and $C_7F_{15}$ aminodiols defined in Example 1 and 5.5 g of triethylamine in 100 g of diisopropyl ether, with constant stirring, and the mixture is then heated to 60° C. for two hours.

After cooling, filtering the triethylamine hydrochloride and evaporation under vacuum of the solvent, a mixture mainly consisting of the esters of the following formulae are obtained, with a yield of 95%:

$$C_8F_{17}CH_2CH_2\underset{\underset{CH_2CH_2OH}{|}}{N}-CH_2CH_2OCOCH_3$$

and $$C_7F_{15}CF=CH-CH_2-\underset{\underset{CH_2CH_2OH}{|}}{N}-CH_2CH_2OCOCH_3$$

EXAMPLE 12

The reaction is carried out as in Example 11, but replacing the acetyl chloride with methacryloyl chloride.

A very fluid product mainly consisting of the esters of the following formulae is thereby obtained, with a yield of 96%:

$$C_8F_{17}CH_2CH_2\underset{\underset{CH_2CH_2OH}{|}}{N}-CH_2CH_2OCO\underset{\underset{CH_3}{|}}{C}=CH_2$$

and $$C_7F_{15}-CF=CH-CH_2-\underset{\underset{CH_2CH_2OH}{|}}{N}-CH_2CH_2OCO\underset{\underset{CH_3}{|}}{C}=CH_2$$

In infrared spectroscopy, an OH band at 3,380 cm$^{-1}$ and an ester band at 1,710, cm$^{-1}$ are observed.

EXAMPLE 13

(a) 1,449 g of 1-iodo-2-perfluorooctyl ethane and 671 g of aniline are introduced into a 2-liter reactor, and the mixture is heated at 150° C. for 4.5 hours, with stirring. After cooling to 60° C., the reaction mass is washed at this temperature by decantation first with 1.25 liter of 10% NaOH solution and then three times with 1.25 liter of water so that the final water washing is neutral and free from iodide ions.

The lower organic phase is then distilled to remove the fractions distilling from 70° C. under 1,600 Pa to 51° C. under 267 Pa and then distilled under 200 Pa, collecting the fraction boiling from 124° to 134° C. 1,246 g of 1-anilino-2-perfluorooctylethane in the form of a yellow solid, melting at 30° C., are thereby obtained.

(b) 221.8 g of this product are charged into a 0.5-liter Hastelloy C autoclave equipped with a PTFE bowl and a magnetic stirrer. After purging three times with nitrogen, 22 g of ethylene oxide are introduced and the contents are heated at 165° C. for 8 hours, with stirring. 12 g of ethylene oxide are then added and the contents are heated for a further period of 6 hours at 163°–164° C.

After emptying the autoclave, 238 g of a light chestnut-brown waxy solid, melting at 35° C., more than 96% (analysis by GC) of which consists of the amino alcohol $$C_8F_{17}CH_2CH_2\underset{\underset{CH_2CH_2OH}{|}}{N}-C_6H_5$$

are thereby obtained.

EXAMPLE 14

(a) 540 g of aniline and 1,080 g of a mixture of the 2-perfluoroalkyl ethyl iodides $C_nF_{2n+1}CH_2CH_2I$ with the following percentage composition by weight of $C_nF_{2n+1}$ straight-chains, and the mean molar mass of which is 537, are introduced into a 2-liter reactor:

| | |
|---|---|
| $C_6F_{13}$ | 54.3% |
| $C_8F_{17}$ | 27.0% |
| $C_{10}F_{21}$ | 10.7% |
| $C_{12}F_{25}$ | 4.1% |
| $\geq C_{14}F_{29}$ | 2.5% |

The mixture is heated at 150°–152° C. for 5 hours, with stirring, and is then cooled to 60° C. and the mass is washed at this temperature first with one liter of 10% NaOH solution and then three times with one liter of water until the aqueous phase is neutral and free from iodide ions.

The organic phase is then distilled to remove fractions distilling from 65° C. under 1,200 Pa to 51° C. under 267 Pa and then distilled with a film evaporator (flow rate: 200 ml/h, vacuum: 133 Pa, heating: 190° C., cap temperature: 100° C.).

845 g of a mixture of amines of formula $C_nF_{2n+1}$—$CH_2CH_2$—$NH$—$C_6H_5$ in the form of a purplish pink product which is half-liquid half-solid at ambient temperature and completely (red) liquid at 45° C., are thereby obtained.

(b) 200 g of this product and 19 g of ethylene oxide are charged into the same autoclave as in Example 13-b, and the contents are then heated at 160° C. for 6.5 hours. 10 g of ethylene oxide are then added and the contents are heated again for 6.5 hours at 160° C.

After cooling and depressurizing the autoclave, 215 g of a red product, which is half-liquid and half-solid at ambient temperature and completely liquid at 45° C., are thereby obtained. Analysis by GC shows that more than 96% of this product consists of a mixture of the amino alcohols $$C_nF_{2n+1}-CH_2CH_2-\underset{\underset{CH_2CH_2OH}{|}}{N}-C_6H_5$$

EXAMPLE 15

(a) 287 g of 1-iodo-2-perfluorooctylethane and 199 g of p-phenetidine are charged into a 2-liter reactor and the contents are heated for 5 hours at 150° C., with stirring. The contents are cooled to 95° C. and the mass is washed, at this temperature, by decantation with 0.4 liter of 10% NaOH solution. Three further washings are carried out, also by decantation, with 1 liter of water at 65° C. until the aqueous phase is neutral and free from iodide ions.

The organic phase is then distilled to remove the fraction distilling at 88°–92° C. under 200 Pa, and then distilled under 133 Pa. The fraction boiling at 141°–145° C. is collected and 210 g of crude (purity: 90%) of 1-(p-phenetidino)-2-perfluorooctylethane in the form of an orange yellow solid, melting at 69°–70° C., are thereby obtained.

(b) 130.7 g of the above product is charged into the same autoclave as in Example 13-b, 14 g of ethylene oxide are then added and the contents are heated for 7 hours at 178°–180° C. After cooling and emptying the autoclave, 137 g of crude 1-(N-hydroxyethyl-p-phenetidino)-2-perfluorooctylethane in the form of a light chestnut-brown solid, melting at 40° C. (dark red liquid), are obtained.

EXAMPLE 16

(a) 287 g of 1-iodo-2-perfluorooctylethane and 184.5 g of o-anisidine are charged into a 2-liter reactor and the mixture is heated for 4.5 hours at 115°–120° C. and then for 5.5 hours at 150° C., with stirring. The mass is then washed, by decantation, first with 0.4 l of 10% NaOH solution at 95° C. and then three times with 1 liter of water at 65° C. until the aqueous phase is neutral and free from iodide ions.

The excess o-anisidine is removed by carrying over with steam and the organic phase is distilled at 130° C. under 133 Pa. 240 g of 1-(o-anisidino)-2-perfluorooctylethane in the form of an orange yellow product, melting at 62°–63° C., and with a purity greater than 97%, are thereby collected.

(b) 120.6 g of the above product and 17.4 g of ethylene oxide are introduced into a 0.3-liter stainless steel autoclave equipped with a PTFE bowl and a magnetic stirrer and the contents are heated for 8 hours at 178°–180° C. Three times 18 g of ethylene oxide and 4 MPa of nitrogen are then added again, each addition being followed by heating for 6 hours at 178°–180° C., with stirring.

After cooling and emptying the autoclave, the product is maintained for one hour at 120° C. under 133 Pa and then washed twice with 100 ml of water at 60° C. After removing the fractions distilling under slight vacuum, 112 g of crude 1-(N-hydroxyethyl-o-anisidino)-2-perfluorooctylethane in the form of a dark red liquid are thereby obtained.

EXAMPLE 17

57.5 g of a mixture of the fluorinated amino alcohols $C_8F_{17}CH_2CH_2$—NH—$CH_2CH_2OH$ and $C_7F_{15}CF$=CH—$CH_2$—NH—$CH_2$—$CH_2OH$ (67 and 33 mol % respectively), and then 10 g of 1,2-epoxyhexane are introduced into a 0.1-liter conical flask fitted with a condenser and equipped for stirring with a magnetic follower and heated in an oil bath.

The contents are heated for 6 hours at 105°–110° C., with stirring, and 4 g of the same mixture of fluorinated amino alcohols are then added again and the contents are heated for a further period of 3 hours at 110° C.

69.5 g of a mixture of the compounds of the following formulae, in the form of an orange-coloured liquid which is viscous at 40° C., are thereby obtained:

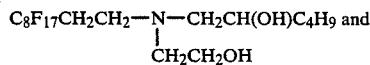

$$C_8F_{17}CH_2CH_2-N(-CH_2CH(OH)C_4H_9)(CH_2CH_2OH) \text{ and}$$

EXAMPLE 18

24.8 g of the same mixture of fluorinated amino alcohols and 9.2 g of 1,2-epoxydodecane are introduced into the same apparatus as in Example 17 and the contents are heated for 3.75 hours at 125° C., with stirring.

33 g of an orange liquid which is viscous at 40° C., consisting of a mixture of the aminodiols of the following formulae are thereby obtained:

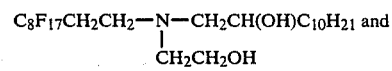

$$C_8F_{17}CH_2CH_2-N(-CH_2CH(OH)C_{10}H_{21})(CH_2CH_2OH) \text{ and}$$

-continued

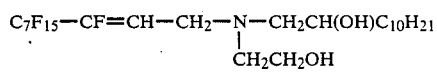

$$C_7F_{15}-CF=CH-CH_2-N(-CH_2CH(OH)C_{10}H_{21})(CH_2CH_2OH)$$

EXAMPLE 19

26.1 g of the same mixture of fluorinated amino alcohols and 14.15 g of 1,2-epoxyoctadecane are introduced into the same apparatus as in Example 17 and the contents are heated at 120° C. for 7.75 hours, with stirring. 3.6 g of the mixture of fluorinated amino alcohols are then added again and the contents are heated for a further period of 2 hours at 120° C., and then for 4 hours at 140° C., with stirring.

42 g of a chestnut-brown solid product, melting at 40° C., consisting of a mixture of aminodiols of the following formulae, are thereby obtained:

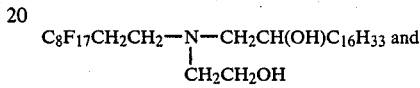

$$C_8F_{17}CH_2CH_2-N(-CH_2CH(OH)C_{16}H_{33})(CH_2CH_2OH) \text{ and}$$

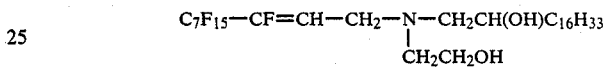

$$C_7F_{15}-CF=CH-CH_2-N(-CH_2CH(OH)C_{16}H_{33})(CH_2CH_2OH)$$

EXAMPLE 20

21.6 g of 1,2-epoxybutane and 146.8 g of a mixture of fluorinated amino alcohols $C_nF_{2n+1}$—$C_2H_4$—NH—$C_2H_4OH$ (67 mol %) and $C_{n-1}F_{2n-1}$—CF=CH—$CH_2$—NH—$C_2H_4OH$ (33 mol %) with the following straight-chain $C_nF_{2n+1}$ percentage composition by weight, are introduced into the same autoclave as in Example 13-b:

| | |
|---|---|
| $C_6F_{13}$ | 55.7% |
| $C_8F_{17}$ | 27.2% |
| $C_{10}F_{21}$ | 10.15% |
| $C_{12}F_{25}$ | 3.9% |
| $\geq C_{14}F_{29}$ | 2.9% |

The contents are first heated at 87°–88° C. for 6 hours, 3.2 g of 1,2-epoxybutane are then added and the contents are heated for a further period of 4.5 hours at 107° C.

After cooling, emptying the autoclave and removing the fractions distilling at 80° C. under 133 Pa, 154 g of an orange liquid with a small amount of sediment at ambient temperature, but completely clear at 30° C., are obtained. This product is a mixture of the aminodiols of formulae:

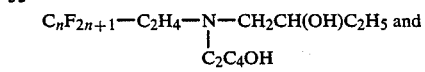

$$C_nF_{2n+1}-C_2H_4-N(-CH_2CH(OH)C_2H_5)(C_2H_4OH) \text{ and}$$

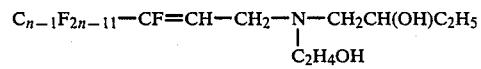

$$C_{n-1}F_{2n-11}-CF=CH-CH_2-N(-CH_2CH(OH)C_2H_5)(C_2H_4OH)$$

EXAMPLE 21

476 g of the same mixture of fluorinated amino alcohols as in Example 20 and 184 g of 1,2-epoxydodecane are introduced into a 1-liter conical flask fitted with a condenser and equipped for stirring with a magnetic follower and heated with an oil bath, and the contents are then heated for 3 hours at 120°–125° C.

651 g of a mixture of aminodiols of the following formulae, in the form of a viscous orange liquid, with a small amount of sediment at ambient temperature, but completely clear at 40° C., are thereby obtained:

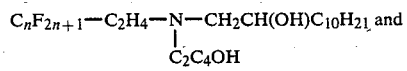

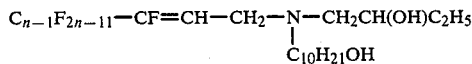

EXAMPLE 22

570 g of the same mixture of fluorinated amino alcohols as in Example 20 and 144.3 g of styrene oxide are charged into the same apparatus as in Example 21, and the contents are heated at 113° C., with stirring. The temperature then rises unaided up to 134° C. The contents are cooled to 113°–115° C. and maintained at this temperature for one hour.

702 g of an orange yellow liquid which is very viscous at ambient temperature, but fluid at 40° C., are thereby obtained. NMR analysis shows that this product contains a proportion of 78 mol % of aminodiols of formulae:

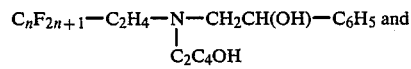

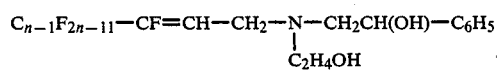

and a proportion of 22 mol % of aminodiols of formulae:

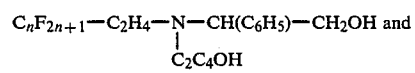

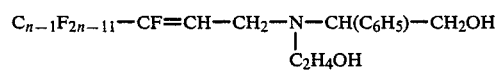

EXAMPLE 23

(a) 6 g of a mixture consisting of 4.5 g of ethanolamine and 1.5 g of cuprous chloride are introduced into a 1-liter stainless steel autoclave, a vacuum is created within the autoclave, the autoclave is cooled with liquid nitrogen and 246 g of perfluoroethyl iodide and 64 g of vinylidene fluoride are introduced therein. The contents are then heated for 21 hours at 145° C., with stirring, 64 g of vinylidene fluoride are then introduced again and the contents are heated for a further period of 21 hours at 145° C.

After cooling and purging the autoclave, 146 g of a product, the results of the GC analysis of the main components of which are as follows, are collected:

| | | |
|---|---|---|
| Unconverted $C_2F_5I$ | | 29.3% |
| $C_2F_5(CH_2CF_2)_nI$ where | n = 1: | 23.5% |
| | n = 2: | 19.9% |
| | n = 3: | 10.2% |
| | n = 4: | 4.12% |
| | n = 5: | 1.3% |
| | n = 6: | 0.4% |
| | n = 7: | 0.1% |

This product is distilled under vacuum and the fraction boiling at 59° C. under 4,666 Pa is collected. 28.6 g of the compound $C_2F_5$—$(CH_2CF_2)_2I$ are thereby obtained.

(b) 4 g of a mixture consisting of 3 g of ethanolamine and 1 g of cuprous chloride, and then 374 g of $C_2F_5$—$(CH_2CF_2)_2I$ are charged into the same autoclave as above. Ethylene is then injected for 7 hours so as to maintain a pressure of 2.6 MPa at 145° C.

After depressurizing and purging the autoclave, the product is distilled and the fraction boiling at 70°–75° C. under 133 Pa is collected. It weighs 276 g and consists of the compound $C_2F_5$—$(CH_2CF_2)_2$—$CH_2CH_2I$, which is a white solid, melting at 54° C.

(c) 100 g of this compound and 100 g of tert-amyl alcohol are charged into a 0.25-liter reactor. The contents are heated to 100° C., with stirring, and while maintaining this temperature, 61 g of ethanolamine are then introduced in the course of 30 minutes. The contents are then heated to reflux and maintained at the reflux temperature for 7 hours.

After cooling, the contents are allowed to settle and the upper phase is collected and washed by decantation at ambient temperature first with 0.1 liter of 10% NaOH solution and then three times with 0.1 liter of water and the fraction distilling at 31° C. under 6,000 Pa is then removed. The residue weighs 60.8 g and consists of the amino alcohol $C_2F_5(CH_2CF_2)_2C_2H_4NHC_2H_4OH$.

(d) 64 g of this amino alcohol are introduced into the same apparatus as in Example 17 and heated to 65° C., with stirring. At this temperature and the stirring still being maintained, a mixture of ethylene oxide (4.4 l/h) and nitrogen (0.5 l/h) is injected by bubbling through at atmospheric pressure, for 4.5 hours. 72 g of the crude aminodiol $C_2F_5(CH_2CF_2)_2$—$C_2H_4$—$N(C_2H_4OH)_2$, which is in the form of a red paste, are thereby obtained.

EXAMPLE 24

At ambient temperature and with constant stirring, 4.7 g of heptanoyl chloride are added dropwise to a solution of 12 g of the aminodiol of the previous example and 3.2 g of triethylamine in 100 ml of acetone. When the addition of heptanoyl chloride is complete, the contents are heated for two hours at the reflux temperature, and then cooled, the triethylamine hydrochloride is filtered off and the solvent is evaporated by distillation under vacuum. The residue is then redissolved in ethyl ether, and the solution is filtered to remove the last traces of triethylamine hydrochloride. After evaporation of the ether, the ester of the following formula, characterized by infrared spectroscopy (OH band at 3,360 cm$^{-1}$, ester band at 1,735 cm$^{-1}$), is mainly obtained. Yield: 98%.

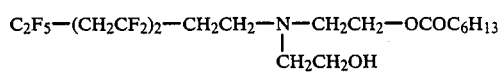

EXAMPLE 25

The reaction is carried out as in Example 24, but replacing the heptanoyl chloride with 4.45 g of benzoyl chloride. The ester of the following formula, characterized by infrared spectroscopy (OH band at 3,330 cm$^{-1}$; ester band at 1,710 cm$^{-1}$), is mainly obtained.

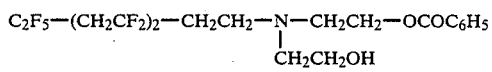

$$C_2F_5-(CH_2CF_2)_2-CH_2CH_2-\underset{\underset{CH_2CH_2OH}{|}}{N}-CH_2CH_2-OCOC_6H_5$$

EXAMPLE 26

48.2 g of 3-perfluorooctylpropylamine and 18.5 g of 1,2-epoxydodecane are introduced into the same apparatus as in Example 17 and the contents are heated at 80°–90° C. for 3 hours, with stirring. 18 g of 1,2-epoxydodecane are then added again and the contents heated at 100° C. for 6 hours, 3.8 g of 3-perfluorooctylpropylamine are then added again and the heating continued for 5 hours at 110° C.

87 g of the following aminodiol, in the form of a light beige solid, melting at 40° C., are thereby obtained.

$$C_8F_{17}(CH_2)_3N(CH_2\underset{\underset{OH}{|}}{CH}-C_{10}H_{21})_2$$

WEAR RESISTANCE TESTS

The wear resistance power of the lubricant compositions containing the mineral oil Neutral Solvent 200 as the base oil and a fluorinated chain compound according to the invention as the additive was determined using the SHELL EP 4-ball machine, the description of which appears in "Annual Book of ASTM Standards", Part 24 (1979), pages 680 to 688.

The test consists in rotating a 12-mm-diameter ball at a rotation speed of 1,500 rpm on three other balls maintained stationary and covered with the lubricant under study. A load of 40 or 70 daN is applied with a lever system which pushes the three stationary balls towards the upper ball placed in a mandril.

The wear resistance efficacy of a lubricant is determined by the mean value of the diameters of the wear marks on the three fixed balls, after one hour of operation.

The results obtained with the different fluorinated additives according to the invention are presented collectively in Table I, the additives being identified in the form Fx where x corresponds to the number of the example which describes the preparation of the fluorinated additive. The proportion by weight of the fluorinated additive incorporated in the base oil is shown in the second column.

TABLE I

| Fluorinated additive | Proportion % by weight | Diameter of the wear mark in mm for an applied load of | |
|---|---|---|---|
| | | 40 daN | 70 daN |
| None (control) | | 1.44 | 2.37 |
| F1 | 0 1 | 0.60 | 0.56 |
| F2 | " | 0.67 | 1.1 |
| F3 | " | 0.42 | 0.50 |
| F4 | " | 0.65 | 0.78 |
| F5 | " | 0.68 | 1.08 |
| F6 | " | 0.39 | 0.61 |
| F7 | " | 0.66 | 0.77 |
| F8 | " | 0.77 | — |
| F9 | " | 0.80 | — |
| F10 | " | 0.72 | 1.1 |
| F11 | " | 0.57 | 0.79 |
| F12 | " | 0.37 | 0.77 |
| F13 | 0.2 | 0.53 | — |
| F13 | 0.3 | 0.43 | 0.71 |

TABLE I-continued

| Fluorinated additive | Proportion % by weight | Diameter of the wear mark in mm for an applied load of | |
|---|---|---|---|
| | | 40 daN | 70 daN |
| F14 | 0.2 | 0.59 | — |
| F14 | 0.3 | 0.36 | — |
| F15 | " | 0.43 | — |
| F16 | " | 0.44 | 0.64 |
| F17 | 0.1 | 0.69 | 0.94 |
| F18 | " | 0.67 | 0.76 |
| F19 | " | 0.65 | 0.77 |
| F21 | " | 0.70 | 1.10 |
| F22 | " | 0.68 | 0.90 |
| F23 | " | 0.84 | 1.05 |
| F24 | " | 0.59 | 0.78 |
| F25 | " | 0.63 | 0.78 |

The same method was applied to determine the wear resistance efficacy of lubricant compositions obtained by adding to the mineral oil 200N, the main conventional additives which form part of the composition of the SAE 15W40 category of oil for a petrol engine except zinc dithiophosphate which is replaced with a fluorinated chain compound according to the invention. The main conventional additives of an oil of the SAE 15W40 type are: a detergent (excess base-containing sulphonate), a dispersant (succinimide) and an antioxidant (aromatic amine). The results of these tests are collated in Table II below:

| Fluorinated additive | Proportion % by weight | Diameter of the wear mark in mm for an applied load of: | | |
|---|---|---|---|---|
| | | 40 daN | 60 daN | 70 daN |
| None (control) | | 0.60 | 1.80 | 2.10 |
| F1 | 0.1 | 0.37 | — | 0.82 |
| F1 | 0.3 | 0.37 | — | 0.86 |
| F2 | 0.2 | 0.37 | — | 0.70 |
| F3 | " | 0.37 | — | 0.86 |
| F4 | " | 0.38 | — | 0.68 |
| F5 | " | 0.38 | — | 0.63 |
| F6 | " | 0.45 | — | 0.86 |
| F7 | " | 0.36 | — | 0.68 |
| F8 | " | 0.41 | — | — |
| F9 | " | 0.44 | — | — |
| F10 | " | 0.40 | — | 0.75 |
| F11 | " | 0.36 | — | 0.66 |
| F12 | " | 0.36 | — | 0.69 |
| F13 | 0.4 | 0.41 | — | 0.63 |
| F14 | " | 0.41 | — | 0.56 |
| F15 | " | 0.40 | — | 0.54 |
| F16 | " | 0.40 | — | 0.64 |
| F17 | 0.23 | 0.56 | — | 0.89 |
| F18 | 0.3 | — | 0.59 | 0.75 |
| F19 | 0.15 | — | 0.57 | — |
| F19 | 0.2 | — | — | 0.82 |
| F19 | 0.3 | — | 0.59 | 0.75 |
| F21 | 0.2 | — | 0.45 | 1.84 |
| F21 | 0.27 | — | 0.45 | 1.28 |
| F22 | 0.2 | 0.37 | — | 0.75 |
| F25 | " | 0.54 | — | 0.77 |
| F26 | " | 0.46 | — | — |

The same method was also applied for studying the wear resistance properties of lubricant compositions combining the zinc dithiophosphates and the fluorinated derivatives according to the invention, so that the concentrations of zinc, phosphorus and sulphur were lower than those in conventional oils. In Table III below, in which the results obtained are collated, additive A is a zinc dialkyldithiophosphate which is a wear resistance additive and additive B is a zinc alkylaryldithiophosphate which is an antioxidant.

TABLE III

| Lubricant composition | Zinc concentration (ppm) | Diameter of wear mark for a load of: 40 daN | 70 daN |
|---|---|---|---|
| Controls: | | | |
| 200 N oil + 1% of A | 1060 | 0.41 | 0.90 |
| 200 N oil + 0.5% of A | 530 | 0.42 | 0.90 |
| 200 N oil + 0.5% of A + 0.1% of $F_3$ | " | 0.40 | 0.60 |
| 200 N oil + 0.5% of A + 0.1% of $F_4$ | " | 0.39 | 0.64 |
| 200 N oil + 0.5% of A + 0.1% of $F_{22}$ | " | 0.42 | 0.60 |
| 200 N oil + 0.5% of A + 0.2% of $F_{22}$ | " | 0.40 | 0.50 |
| Control: | | | |
| 200 N oil + 1% of B | 330 | 0.77 | 1.97 |
| 200 N oil + 1% of B + 0.1% of $F_3$ | " | 0.37 | 0.54 |
| 200 N oil + 1% of B + 0.1% of $F_4$ | " | 0.35 | 0.55 |

These results show that the combination of the fluorinated derivatives according to the invention with zinc dithiophosphates enable compositions with low zinc concentration which have remarkable wear resistance properties to be obtained.

The wear resistance properties of the fluorinated compounds according to the invention were also tested using the FALEX apparatus described in "Annual Book of ASTM Standards" Part 24 (1978), pages 594 to 601, using an oil of the SAE 15W40 type, in which the zinc dithiophosphate was replaced with a fluorinated compound according to the invention. Either the rupture of the tool, or its loss of weight (wear), after subjecting it for 3 hours to a load of 250 kg, is recorded. The results obtained are collated in Table IV below:

TABLE IV

| Fluorinated additive | Proportion (% by weight) | Loss of weight in mg |
|---|---|---|
| None (control) | | Rupture |
| F1 | 0.22 | 106 |
| F13 | 0.30 | 102 |
| F17 | 0.23 | 100 |
| F19 | 0.31 | 66 |
| F22 | 0.20 | 30 |

ENGINE BENCH TESTS

Two petrol-engine oils of the SAE 15W40 category and each containing a fluorinated compound according to the invention were tested on an engine bench, in comparison with a commercial oil of the same category containing a zinc dialkyldithiophosphate (wear resistance additive commonly used in engine oils).

The control oil ($O_1$) is a commercial oil which contains, in addition to the zinc dialkyldithiophosphate, the other conventional additives forming part of the composition of this type of lubricant (detergent, dispersant, antioxidant, viscosity enhancer and coagulation inhibitor).

The oils ($O_2$) and ($O_3$) according to the invention differ from the control oil ($O_1$) only by the fact that the zinc dialkyldithiophosphate is replaced with 0.3% of the compound $F_{13}$ in oil ($O_2$) and with 0.3% of the compound $F_1$ in oil ($O_3$).

The trials were carried out under the following conditions:

Engine: RENAULT 20TS, 829/7 type, with a cylinder volume of 2,000 cm³, an engine rating of 81 kW and a nominal engine speed of 5,600 rpm.
Running-in: 10 hours
Period of trial (after running-in): 100 hours without oil change
Power: full load
Periodic monitoring of oil and water temperatures (inlet and outlet).

After the trial, the engine parts were analyzed and graded according to the European Standard M02A78. The results are collated in the following table:

TABLE V

| | Maximum grading | Oil $O_1$ | Oil $O_2$ | Oil $O_3$ |
|---|---|---|---|---|
| Rings: clearance | 20 | 20 | 19.8 | 20 |
| Pistons: | | | | |
| skirt | 10 | 8.4 | 8.8 | 8.9 |
| top land (1 + 2) | 10 | 2.5 | 4.1 | 5.4 |
| carbon grooves (1 + 2 + 3) | 30 | 24.7 | 25.8 | 25.3 |
| varnish grooves (1 + 2 + 3) | 20 | 6.2 | 10.4 | 11.1 |
| groove bases | 10 | 2.1 | 6.0 | 5.8 |
| TOTAL | 100 | 63.9 | 74.9 | 76.5 |

HEAT STABILITY TESTS

In order to evaluate their behaviour under conditions close to those in an engine, the fluorinated compound according to the invention were subjected to a thermogravimetric analysis in air. This test consists in subjecting a sample of the product to an increase in temperature (2° C./min), at an air flow rate of 10 l/h and recording the percentage weight losses at 200°, 250° and 300° C.

The results obtained are collated in the following table. The behaviour of the following fluorinated compounds recommended in the prior art (French Pat. No. 2,520,377) is given in the beginning of the table for comparison:

P1: $C_8F_{17}$—$C_2H_4$—NH—$C_2H_4OH$
P2: $C_8F_{17}$—$C_2H_4$—N($C_2H_4OH$)$_2$
P3: $C_nF_{2n+1}$—$C_2H_4$—N($C_2H_4OH$)$_2$ (n defined as in Example 2 above)

TABLE VI

| Fluorinated compound | Weight loss (%) at 200° C. | 250° C. | 300° C. |
|---|---|---|---|
| P1 | 80 | 94.6 | 97 |
| P2 | 27.5 | 92.6 | 96.4 |
| P3 | 43.8 | 96.5 | 99.9 |
| F1 | 7.5 | 31.5 | 80 |
| F2 | 7.5 | 30 | 80.6 |
| F3 | 5 | 16.6 | 48 |
| F4 | 4.4 | 15.6 | 43 |
| F5 | 4.8 | 13.8 | 28.7 |
| F6 | 2.4 | 18.1 | 61.2 |
| F7 | 6.8 | 28.7 | 80.3 |
| F8 | 6.2 | 37.5 | 97.5 |
| F9 | 8.1 | 37.5 | 85 |
| F12 | 14.8 | 57 | 87 |
| F13 | 9.5 | 56.2 | 92 |
| F15 | 17.5 | 89 | — |
| F17 | 5 | 17.5 | 58 |
| F18 | 5 | 17.5 | 58 |
| F19 | 3 | 16 | 41 |
| F21 | 4 | 20 | 62.5 |
| F22 | 5 | 25 | 64.4 |
| F25 | 9.4 | 43.8 | 86.3 |
| F26 | 2.5 | 6.5 | 25 |

What is claimed is:

1. Lubricating oils comprising from 0.01 to 0.5% by weight of at least one polyfluorinated compound of the general formula:

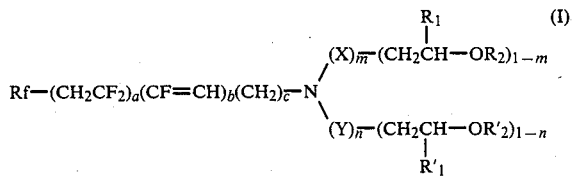

in which:
Rf denotes a perfluorinated radical,
a is an integer ranging from 0 to 10,
b is equal to 0 or 1, but can be equal to 1 only if simultaneously, a is equal to 0 and c is equal to 1,
c is an integer ranging from 1 to 4, but is equal to 2 when a is other than 0,
m and n are equal to 0 or 1,
X represents an optionally substituted aryl radical,
Y represents the 2-hydroxy-1-phenylethyl group,
$R_1$ and $R'_1$, which may be identical or different, each represent a hydrogen atom, an alkyl radical containing from 1 to 20 carbon atoms, a cycloalkyl radical; containing 5 or 6 carbon atoms, or an optionally substituted aryl radical,
$R_2$ and $R'_2$, which may be identical or different, each represent a hydrogen atom or the acyl residue of an aliphatic alicyclic or aromatic carboxylic acid, at least one of the symbols $R_1$ and $R_2$ being other than hydrogen or a methyl radical if the sum of a+m+n is zero.

2. Lubricants according to claim 1, wherein Rf is a straight-chain or branched perfluroalkyl radical containing from 2 to 20 carbon atoms.

3. Lubricants according to claim 1, further comprising a mixture of polyfluorinated compounds, the Rf radicals of which are different.

4. Lubricants according to claim 1, wherein a is zero and c is equal to 1 or 2.

5. Lubricants according to claim 1, wherein m is equal to 1 and X is an unsubstituted phenyl radical or phenyl radical substituted with an alkyl or alkoxy group containing from 1 to 4 carbon atoms.

6. Lubricants according to claim 1, wherein the polyfluorinated compound is chosen from those of the formulae:

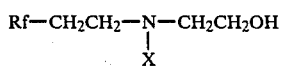

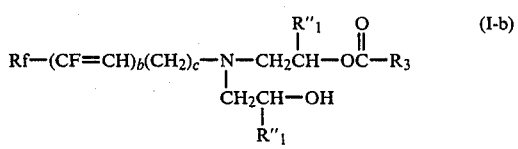

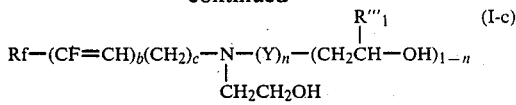

in which the sum b+c is equal to 2, $R''_1$ is a hydrogen atom or a methyl radical, $R'''_1$ represents an alkyl radical containing an even number, from 2 to 16, of carbon atoms and $R_3$ represents an aliphatic, alicyclic or aromatic radical.

7. Lubricants according to claim 1, wherein the concentration of polyfluorinated compound is comprised between 0.05 and 0.5% by weight.

8. Lubricants according to claim 1, further comprising the polyfluorinated compound combined with conventional additives.

9. Polyfluorinated compounds of the formula:

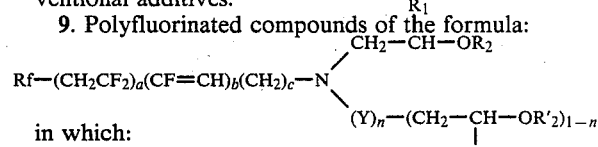

in which:
Rf denotes a perfluorinated radical,
a is an integer ranging from 0 to 10,
b is equal to 0 or 1, but can be equal to 1 only if, simultaneously, a is equal to 0 and c is equal to 1,
c is an integer ranging from 1 to 4, but is equal to 2 when a is other than 0,
n is equal to 0 or 1,
Y represents the 2-hydroxy-1-phenylethyl group,
$R_1$ and $R'_1$, which may be identical or different, each represent a hydrogen atom, an alkyl radical containing from 1 to 20 carbon atoms, a cycloalkyl radical containing 5 or 6 carbon atoms, or an optionally substituted aryl radical,
$R_2$ and $R'_2$, which may be identical or different, each represent a hydrogen atom or the acyl residue of an aliphatic, alicyclic or aromatic carboxylic acid, at least one of the symbols $R_1$ and $R_2$ being other than hydrogen or a methyl radical if the sum of +n is zero.

10. Compounds according to claim 9, wherein Rf is a straight-chain or branched perfluoroalkyl radical containing from 2 to 20 carbon atoms.

11. Compounds according to claim 9, wherein they are of the formula:

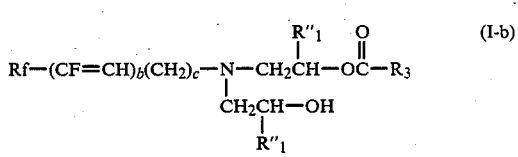

in which the sum b+c is equal to 2, $R''_1$ is a hydrogen atom or a methyl radical and $R_3$ is an aliphatic, alicyclic or aromatic radical.

12. Compounds according to claim 9, wherein they are of the formula:

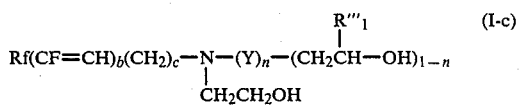

in which the sum b+c is equal to 2 and $R'''_1$ represents an alkyl radical containing an even number, from 2 to 16, of carbon atoms.

* * * * *

UNITED STATES PATENT AND TRADEMARK OFFICE
CERTIFICATE OF CORRECTION

PATENT NO. : 4,832,859

DATED : May 23, 1989

INVENTOR(S) : Dominique BASSET, Jean-Claude FAYARD, Marc HERMANT, Pierre DURUAL, and Laurent GERMANAUD It is certified that error appears in the above-identified patent and that said Letters Patent is hereby corrected as shown below:

Column 2, line 34; delete "which", insert --known--.

Column 11, line 54; insert the following formula:

$$C_7F_{15}-CF=CH-CH_2-\underset{\underset{CH_2-CH_2OH}{|}}{N}-CH_2CH(OH)C_4H_9$$

Column 12, line 56; the formula should read:

$$C_nF_{2n+1}-C_2H_4-\underset{\underset{C_2H_4OH}{|}}{N}-CH_2CH(OH)C_2H_5 \quad \text{and}$$

$$C_{n-1}F_{2n-1}-CF=CH-CH_2-\underset{\underset{C_2H_4OH}{|}}{N}-CH_2CH(OH)C_2H_5$$

Column 13, line 8; the formula should read:

$$C_nF_{2n+1}-C_2H_4-\underset{\underset{C_2H_4OH}{|}}{N}-CH_2CH(OH)C_{10}H_{21} \quad \text{and}$$

$$C_{n-1}F_{2n-1}-CF=CH-CH_2-\underset{\underset{C_2H_4OH}{|}}{N}-CH_2CH(OH)C_{10}H_{21}$$

UNITED STATES PATENT AND TRADEMARK OFFICE
CERTIFICATE OF CORRECTION

PATENT NO. : 4,832,859

DATED : May 23, 1989

INVENTOR(S) : Dominique BASSET, Jean-Claude FAYARD, Marc HERMANT, Pierre DURUAL, and Laurent GERMANAUD It is certified that error appears in the above-identified patent and that said Letters Patent is hereby corrected as shown below:

Column 13, line 31; the formula should read:

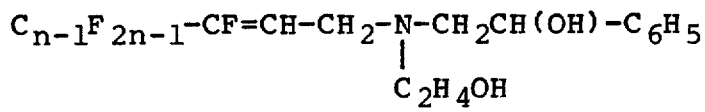

Column 13, line 40; the formula should read:

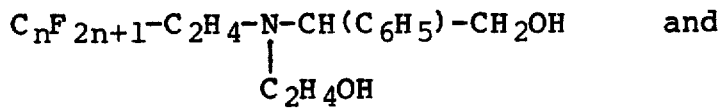

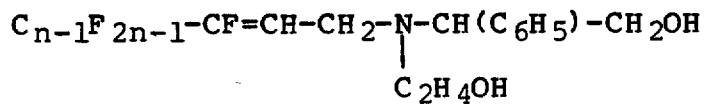

Claim 9, line 40; before "+ n is", insert --a--.

UNITED STATES PATENT AND TRADEMARK OFFICE
CERTIFICATE OF CORRECTION

PATENT NO. : 4,832,859

DATED : May 23, 1989

INVENTOR(S) : Dominique BASSET, Jean-Claude FAYARD, Marc HERMANT, Pierre DURUAL, and Laurent GERMANAUD It is certified that error appears in the above-identified patent and that said Letters Patent is hereby corrected as shown below:

Column 20, lines 18-23, this portion of claim 9 should read as follows:

9.     Polyfluorinated compounds of the formula:

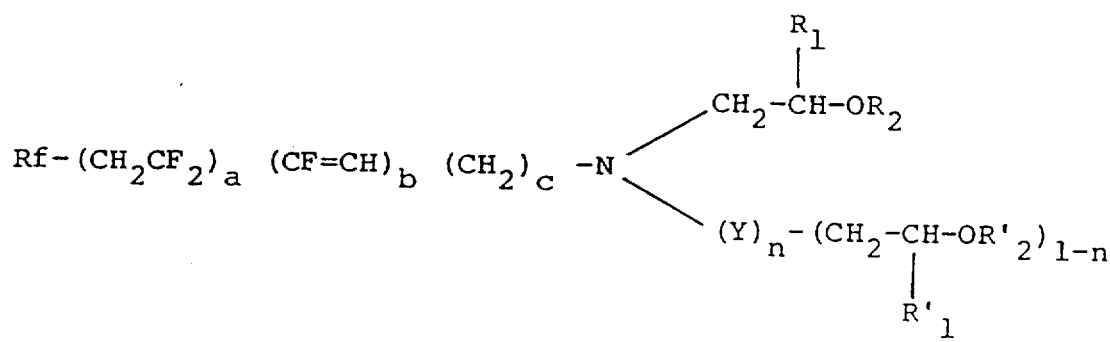

in which:

Signed and Sealed this

Seventh Day of August, 1990

*Attest:*

HARRY F. MANBECK, JR.

*Attesting Officer*      *Commissioner of Patents and Trademarks*